United States Patent [19]

Lohr et al.

[11] 3,900,210

[45] Aug. 19, 1975

[54] ENERGY ABSORPTION ARRANGEMENT IN VEHICLE PASSENGER RESTRAINT SYSTEM

[75] Inventors: Thomas E. Lohr, Warren; John J. Sack, Bloomfield Hills, both of Mich.

[73] Assignee: Allied Chemical Corporation, New York, N.Y.

[22] Filed: Nov. 10, 1972

[21] Appl. No.: 305,383

Related U.S. Application Data

[63] Continuation of Ser. No. 83,557, Oct. 23, 1970, abandoned.

[52] U.S. Cl. ............................................ 280/150 AB
[51] Int. Cl. ............................................. B60r 21/10
[58] Field of Search ............... 280/150 AB; 55/380; 244/145

[56] References Cited
UNITED STATES PATENTS 3,204,391    9/1965    Schwab.................................. 55/380
3,222,016   12/1965    Boone................................... 244/145
3,364,663    1/1968    Lagerstrom............................ 55/380
3,451,693    6/1969    Carey............................ 280/150 AB
3,473,824   10/1969    Carey et al..................... 280/150 AB
3,476,402   11/1969    Wilfert.......................... 280/150 AB
3,618,979   11/1971    Gulette......................... 280/150 AB
3,761,111    9/1973    Kemper......................... 280/150 AB

*Primary Examiner*—Kenneth H. Betts
*Attorney, Agent, or Firm*—Ernest D. Buff; Jonathan Plaut

[57] ABSTRACT

This invention relates to energy absorption in a passenger restraint system as a result of the use of an expansible barrier contained within the passenger restraint bag. More specifically, this invention relates to the introduction of an energy absorbing elastic bag or other barrier material within the air bag which is utilized to restrain forward motion of a passenger within a motor vehicle.

3 Claims, 4 Drawing Figures

INVENTORS:
JOHN J. SACK
THOMAS E. LOHR
BY

ATTORNEY

INVENTORS:
JOHN J. SACK
THOMAS E. LOHR
BY

ATTORNEY

ENERGY ABSORPTION ARRANGEMENT IN VEHICLE PASSENGER RESTRAINT SYSTEM

This is a continuation of application Ser. No. 83,557, filed Oct. 23, 1970 now abandoned This invention relates to energy absorption in a passenger restraint system as a result of the use of an expansible barrier contained within the passenger restraint bag. More specifically this invention relates to the introduction of an energy absorbing elastic bag or other barrier material within the air bag which is utilized to restrain forward motion of a passenger within a motor vehicle. Particularly, the energy absorbing elastic barrier acts to dissipate the total amount of energy of the fluid material which inflates the passenger restraint air bag, and especially to reduce the sound level of inflation.

One of the principal problems in the inflation of passenger restraining air bags by a generated gas or gas from a component gas source, or a combination of the two, is the audible sound caused by a rapid movement of the gas into the passenger restraint bag. The level of sound produced is not uniform in the prior art, as will be described hereinafter in detail, and such sound produced will peak at high and potentially unacceptable levels, such as in the range of 168–170 decibels.

It is therefore an object of this invention to provide for the absorption of the energy of the gas expanding an air bag restraint system, such that the total amount of energy produced for inflation of the air bag is dissipated over a period of time and the peak levels of sound pressure are reduced so that decibel level is lowered into an acceptable range. In addition, it is an object of this invention to absorb heat and smoke produced by the use of the inflatable gas medium and to allow for a redundancy advantage, as will be described in more detail hereinafter.

These and other objects and advantages will become more apparent in the context of the following more detailed description of the invention.

Generally, energy absorbing means are provided within a passenger restraint bag, typically to be found within an automobile. The energy absorbing means is in the form of stretchable barrier, in one embodiment a second more elastic smaller inner bag located within the elastic outer bag. The inner bag may be porous so that gas entering into it will be emitted into the outer bag. This energy absorbing, elastic inner barrier, in one embodiment the inner bag, due to its elastic quality expands to take the shape of the outer bag. The absorption of that energy by the inner barrier as a result of its elastic movement under the pressure of the energy entering thereinto dissipate the total amount of said energy over a period of time and reduces the peak decibel level of said energy. When the energy of the inflating material is directed against the wall of the energy absorber, it stretches, breaking up the energy wave. This results in a lowering of the peak decibel range of the system.

In addition, the energy absorption expansion barrier in the form of the inner bag contains heat and smoke, where they exist, of the inflating medium and provides a redundancy advantage in that if said expansion medium should fail, the outer bag would still function to provide passenger restraint.

The U.S. Pat. to Carey et al No. 3,473,824 discloses a system with inner barrier and outer bag arrangement for absorption of kinetic energy of the inflating medium. However, among other differences, the inner barrier is not disclosed as stretchable to take the shape of the outer bag and dissipate over a period of time the energy of the inflating medium, resulting in the peak sound reduction desired, but rather in Carey et al, the inner barrier merely unfolds and then bursts or otherwise emits the inflating medium into the outer bag. Where Carey et al provides for a baffle, the energy absorbing characteristic of stretching is also unprovided for, since gas in one embodiment is circulated around the outside thereof, and the baffle is generally used only as a deflection barrier.

Describing in further detail in relation to the drawings.

Figure 1:
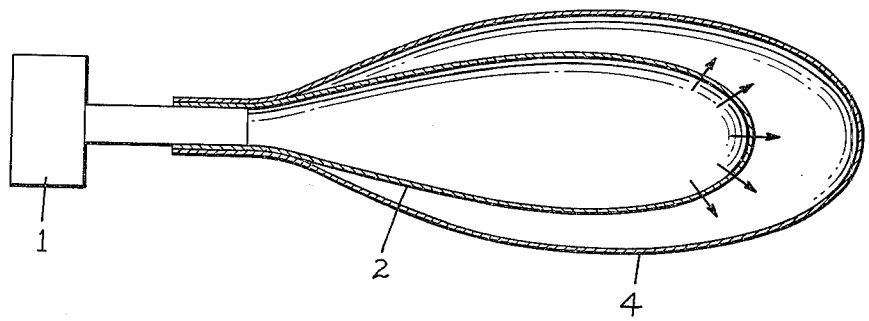
FIG. 1 shows the embodiment of the invention in which an energy absorbing expandable inner bag is located within the passenger restraint outer bag.

According to the invention, an inflating medium is obtained from a source 1, as is well known in the art. For example, the inflating medium, which is gas obtained from either a gas generator system or a compressed gas source, or a combination of the two. The inflating medium is directed at least partially toward an energy absorber in the form of an expandable, elastic barrier. In the embodiment of FIG. 1, the inflating means is directed into an expandable, elastic inner bag 2, said bag having elastic walls which extend under pressure, said inner bag being contained within an outer passenger restraint bag 4. In the embodiment shown in FIG. 1, all of the inflating material is directed into the inner bag, but in the alternate only a portion of the inflating material may be directed into the inner bag, the rest of the inflating material entering directly into the outer bag.

In this embodiment, the inner bag is preferably knit and made, for example, of nylon or polyester material. Other materials may also be utilized. The outer bag may, for example, be woven. The knitting and weaving operations of course, are known and not the object of this invention. The inner knit bag of one embodiment will stretch on filling in the range of at least 50–100% of its original volume and thus absorb the energy of the inflating material entering thereinto, dissipating the total amount of said energy over a period of time and reducing the peak sound level of said energy. The inner elastic bag will move in a direction so as to conform to the space of the outer bag as it expands toward it and will contain heat and smoke which may accompany the inflating material. In an alternative embodiment, the outer bag may be stretchable too, over its original inflatable volume, so that both bags will function to dissipate the energy of the inflating medium.

In the case of the knitted inner bag, as the bag expands the spaces between the knitted material will open and movement of inflating material therethrough from the inner bag to the outer bag (as shown in FIG. 1) will be facilitated.

Figure 2:
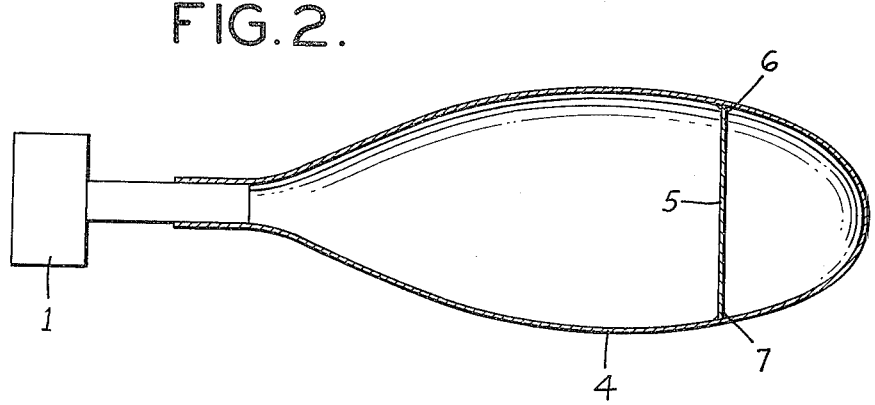
FIG. 2 is a second embodiment of the invention.

In FIG. 2, an alternative embodiment to the expandable inner bag shown in FIG. 1, the energy absorber is the form of an expandable elastic barrier, or membrane, which is located within the outer bag 4 and which is attached to the inner side walls of said outer bag at point 6 and 7, for example. The expandable elastic barrier 5 furnishes similar energy absorbtion to that furnished by the inner bag 2, in that it stretches as a result of the pressure of the energy of the inflating material in one embodiment at least 50–100% its original size, and dissipates that energy over a period of time. The expandable barrier 5 may be made porous as described with relation to the inner bag 1, by knitting it, as previously discussed. Of course, when the expandable barrier 5 is utilized, in comparison to the inner bag of FIG. 1, the inflating material enters directly into the outer bag 4.

Figure 3:
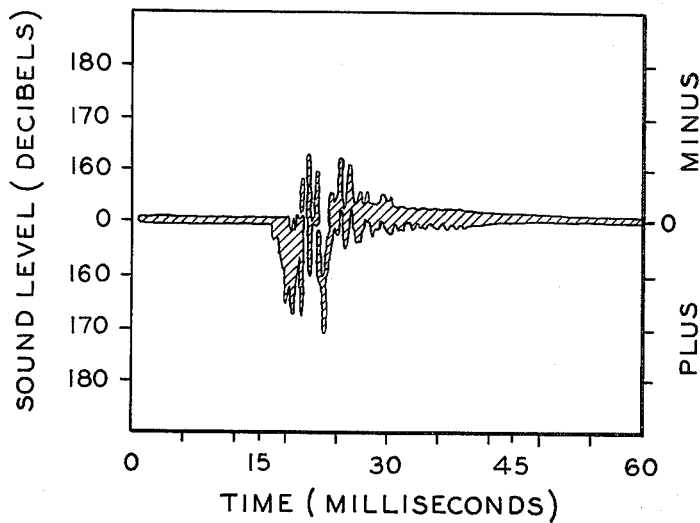
FIG. 3 shows sound pressure versus time where this invention is not employed.
Figure 4:
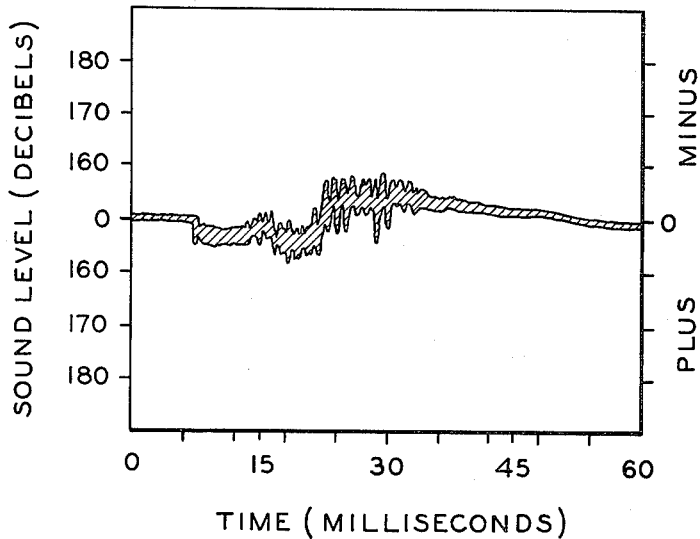
FIG. 4 shows the same components of data as in FIG. 3 where an embodiment of the invention is employed.

The result of employing an energy absorber in the form of an expandable elastic barrier may be obtained from a comparison of the charts of FIGS. 3 and 4. In the example of the chart of FIG. 3, the inflating material enters directly into an outer passenger restraint bag, without any energy absorbing means in a form of expandable barrier. In the chart of FIG. 4, an energy absorber in the form of an inner expandable, elastic knitted bag, as in FIG. 1, was employed. In both cases, it was necessary to work within the parameter of full inflation of the outer bag within 40 millisecs, as such is the accepted period of time by which full bag inflation of passenger restraint must occur. The charts are a sound recording gained from an oscilloscope recording.

In the case of the chart of FIG. 3, the sound level in decibels produced by movement of the inflating medium into the outer bag is irregular and peaks on the positive side between 168–170 decibels, which is equivalent to about 64,512 dynes/sq.cm. Where the inner expandable, elastic bag was utilized, the total amount of energy of the inflating material was dissipated over a period of time as shown in FIG. 4 and the maximum decibel range was 155–157 decibels, which is the equivalent of 21,500 dynes/sq.cm. The reduction in sound level is significant.

Of course, this invention is not concerned with the use of a lower torso restraint, which also may be employed within the outer bag as a matter of choice.

Although the invention has been described with relation to two embodiments, it is understood that the intention is that it only be limited by the scope of the following claims and not by the apparatus, materials, or methods of employing them as recited above.

We claim:

1. A restraint system comprising an outer bag adapted to be filled with an inflating gas, said outer bag being composed of nylon and being stretchable over its original inflated volume, an energy absorbing elastic knitted inner bag having apertures therein and located within said outer bag, means for passing said inflating gas through said apertures and into said outer bag to stretch said inner bag in the range of at least 50-100 percent of its volume without bursting said inner bag 2. Restraint system of claim 1, said inner bag being formed of nylon.

3. Method of lowering the sound level of the inflation of a restraint system having an outer bag adapted to be filled with an inflating gas, said outer bag being composed of nylon and being stretchable over its original inflated volume, and an energy absorbing elastic knitted inner bag having apertures therein, said inner bag being of smaller dimension and more elastic than said outer bag, comprising the steps of circulating at least a portion of said inflating gas against said inner bag within said outer bag to stretch said inner bag in the range of at least 50-100 percent of its volume without bursting said inner bag and thereby absorb energy of said gas and to cause said inner bag on filling to conform to the shape of said outer bag, and passing said inflating gas through said apertures during stretching of said inner bag.

* * * * *

UNITED STATES PATENT OFFICE
CERTIFICATE OF CORRECTION

PATENT NO. : 3,900,210
DATED : August 19, 1975
INVENTOR(S) : Thomas E. Lohr and John J. Sack It is certified that error appears in the above-identified patent and that said Letters Patent are hereby corrected as shown below:

Column 4, line 19, after "bag" insert the following -- during filling of said outer bag, said inner bag being of smaller dimension and more elastic than said outer bag and being so shaped and stretchable on filling as to conform to the shape of said outer bag when said outer bag is filled with said gas. --

Signed and Sealed this ninth Day of December 1975

[SEAL]

Attest:

RUTH C. MASON
Attesting Officer

C. MARSHALL DANN
Commissioner of Patents and Trademarks